United States Patent
Verreet et al.

(10) Patent No.: US 12,529,186 B2
(45) Date of Patent: Jan. 20, 2026

(54) CABLE, STRAND, AND METHOD AND DEVICE FOR PRODUCING A CABLE AND A STRAND

(71) Applicants: KV R&D Center GmbH, Contwig (DE); Verope AG, Zug (CH); Kiswire Ltd., Busan (KR)

(72) Inventors: Thierry Verreet, Homburg (DE); Markus Zogg, Stein am Rhein (CH); Marco Elig, Rieschweiler-Mühlbach (DE); Yeonhwan Bae, Eibrücken (DE)

(73) Assignees: KV R&D Center GmbH, Contwig (DE); Verope AG, Zug (CH); Kiswire Ltd., Busan (KR)

( * ) Notice: Subject to any disclaimer, the term of this patent is extended or adjusted under 35 U.S.C. 154(b) by 0 days.

(21) Appl. No.: 18/034,397

(22) PCT Filed: Nov. 2, 2021

(86) PCT No.: PCT/EP2021/080339
§ 371 (c)(1),
(2) Date: Apr. 28, 2023

(87) PCT Pub. No.: WO2022/090565
PCT Pub. Date: May 5, 2022

(65) Prior Publication Data
US 2023/0407561 A1    Dec. 21, 2023

(30) Foreign Application Priority Data

Nov. 2, 2020   (LU) .................................. 102175

(51) Int. Cl.
*D07B 1/02*    (2006.01)
*D07B 1/00*    (2006.01)
(Continued)

(52) U.S. Cl.
CPC ............... *D07B 1/02* (2013.01); *D07B 1/005* (2013.01); *D07B 1/165* (2013.01); *D07B 5/007* (2013.01);
(Continued)

(58) Field of Classification Search
CPC .......... D07B 1/005; D07B 1/02; D07B 1/025; D07B 1/165; D07B 5/007; D07B 7/145
(Continued)

(56) References Cited

U.S. PATENT DOCUMENTS 3,538,702 A  *  11/1970  Horst .................. D07B 5/10
                                                           57/902
4,275,117 A      6/1981  Crandall
(Continued)

FOREIGN PATENT DOCUMENTS

EP        0252830 A1    1/1988
EP        2000585 A1    12/2008
(Continued)

OTHER PUBLICATIONS

Roland Verreet, Die Grundbegriffe der Drahtseiltechnik, Ingenieurbüro für Drahtseiltechnik Wire Rope Technology Aachen GmbH, https://www.ropetechnology.com/bro_dt/Bro_Grundbegriffe_de.pdf, downloaded on Sep. 1, 2024.

*Primary Examiner* — Shaun R Hurley
(74) *Attorney, Agent, or Firm* — Meunier Carlin & Curfman LLC (57) ABSTRACT

The invention relates to a laid cable (1-1*b*), in particular a laid fiber cable (1-1*b*) or a laid hybrid cable, comprising at least one core strand or a laid core cable (2-2*b*) and at least one outer strand (7-7*b*) surrounding the core strand or the core cable (2-2*b*), the core strand, the core cable (2-2*b*) and/or the at least one outer strand is composed of at least one fiber line (9-9*b*, 10-10*b*). The at least one fiber line
(Continued)

(9-9b, 10-10b) is beneficially made of a composite material having reinforcing fibers (12), the reinforcing fibers (12) of which composite material are laid to form at least one reinforcing line (11). Advantageously, a laid cable which is stable under transverse pressure is provided. The invention also relates to a strand, to a method for manufacturing a cable and a strand, to an apparatus for producing a cable and/or a strand, as well as an apparatus with a drum drive, said apparatus comprising a cable according to the invention.

6 Claims, 4 Drawing Sheets (51) Int. Cl.
  *D07B 1/16* (2006.01)
  *D07B 5/00* (2006.01)
  *D07B 7/14* (2006.01)
(52) U.S. Cl.
  CPC ...... *D07B 7/145* (2013.01); *D07B 2201/2036* (2013.01); *D07B 2201/2044* (2013.01); *D07B 2201/2046* (2013.01); *D07B 2201/2065* (2013.01); *D07B 2205/2003* (2013.01); *D07B 2205/201* (2013.01); *D07B 2205/205* (2013.01); *D07B 2205/3003* (2013.01); *D07B 2205/3007* (2013.01); *D07B 2207/4059* (2013.01); *D07B 2401/2015* (2013.01); *D07B 2401/207* (2013.01); *D07B 2401/2085* (2013.01); *D07B 2501/2015* (2013.01)
(58) Field of Classification Search
  USPC ........................... 57/210, 212, 213, 214, 218
  See application file for complete search history.

(56) References Cited

U.S. PATENT DOCUMENTS

| | | | | |
|---|---|---|---|---|
| 4,680,224 | A | * | 7/1987 | O'Connor ................ C08J 5/04 427/430.1 |
| 4,961,990 | A | * | 10/1990 | Yamada ............ C04B 35/58028 428/323 |
| 5,098,496 | A | * | 3/1992 | Breitigam ............. B29C 70/521 264/237 |
| 7,093,416 | B2 | * | 8/2006 | Johnson ............. H01B 13/0235 57/212 |
| 8,525,033 | B2 | * | 9/2013 | Grether ................ D07B 1/0693 174/128.1 |
| 9,012,781 | B2 | * | 4/2015 | Daniel ...................... H01B 1/04 174/128.1 |
| 9,145,627 | B2 | * | 9/2015 | Wilson .................. B29C 70/025 |
| 2007/0102183 | A1 | * | 5/2007 | Jotti ...................... B29C 48/335 174/68.1 |
| 2008/0164051 | A1 | * | 7/2008 | Lee ......................... H01B 5/105 428/394 |
| 2012/0174557 | A1 | | 7/2012 | Boisseau |
| 2013/0167502 | A1 | * | 7/2013 | Wilson ..................... D02G 3/00 264/165 |
| 2015/0151953 | A1 | * | 6/2015 | Weterings ............... B66C 13/08 212/273 |
| 2018/0058003 | A1 | * | 3/2018 | Lauer ................... D07B 1/0686 |
| 2020/0031623 | A1 | | 1/2020 | Martin |

FOREIGN PATENT DOCUMENTS

| | | |
|---|---|---|
| EP | 3006611 A1 | 4/2016 |
| EP | 2673415 B1 | 7/2017 |
| JP | H01266231 A | 10/1989 |
| JP | H0921082 A | 1/1997 |
| WO | 2008129116 A1 | 10/2008 |
| WO | 2020090834 A1 | 5/2020 |

* cited by examiner

CABLE, STRAND, AND METHOD AND DEVICE FOR PRODUCING A CABLE AND A STRAND

CROSS REFERENCE TO RELATED APPLICATIONS

This application is the U.S. national stage of International Application No. PCT/EP2021/080339, filed on 2021 Nov. 2. The international application claims the priority of LU 102175 filed on 2020 Nov. 2; all applications are incorporated by reference herein in their entirety.

BACKGROUND

The invention relates to a laid cable, in particular a laid fiber cable or a laid hybrid cable, comprising at least one core strand or one laid core cable and at least one outer strand surrounding the core strand or the laid core cable, wherein the core strand, the core cable and/or the at least one outer strand is composed of at least one fiber line. Furthermore, the invention relates to a strand, in particular to a fiber strand or hybrid strand, to a method for producing a laid cable, in particular a laid fiber cable or a laid hybrid cable, as well as to a strand, in particular a fiber strand or a hybrid strand, an apparatus for producing a laid cable and/or a strand, as well as an apparatus with a drum drive, said apparatus comprising a laid cable according to the invention.

The above-mentioned products, apparatii and methods are known from prior art. For the production of stranded wire cables, several wires are helically twisted (=stranded) to strands. This process step is called stranding. Several strands can be helically twisted to form a core cable. The core cable is twisted with several outer strands to form the wire cable, with the outer strands helically surrounding the core cable. This step is called laying (see, for example, the German VDI Guideline 2358). It is conceivable for a cable to have at least one core strand instead of a core cable.

A particularly high tensile strength is possible, while the weight of a wire rope is very high.

In prior art, a distinction is made between laid and braided cables and strands. In the case of a laid cable, outer strands are helically wound around a core cable or core strand, while a braided rope is formed by fibers or wires interlaced with each other in a fabric-like manner or at least has such a layer.

Basic concepts of cable technology are known from prior art, in particular https://www.ropetechnology.com/bro_dt/Bro_Grundbegriffe_de.pdf.

Furthermore, fiber cables are known from prior art, which are used, for example, by sports climbers as safety cables. Such cables, which are braided cables, are formed from elongated, textile plastic fibers that are braided with a sheath braid surrounding the plastic fibers. Strength sufficient for sports applications at low weight is possible. Hybrid cables in which a core cable is formed from a sheathed plastic monofilament bundle which is laid with wire strands are also known. Although such a cable has a strength comparable to that of a wire cable, contact between the wire strands and the monofilament bundle, e.g. under alternating bending loads, can cause damage to the core cable.

EP 2 673 415 B1 describes a cable and a manufacturing method for a cable in which fibers or monofilament bundles are first coated with a matrix material before a stranding point at which stranding point the fibers or monofilament bundles are stranded to form a core cable and are then embedded into the matrix material during stranding at the stranding point to form a core cable. A particular disadvantage of this method is that inner fibers of the monofilament bundle are not surrounded by matrix material. A further disadvantage is that two process steps are required, i.e. coating and subsequent embedding.

JP H01 266231 A shows a cable and a fiber line made of a fiber composite material. The fiber line is made from a mixed yarn comprising carbon or glass fibers and plastic fibers in a pultrusion process. For this purpose, the blended yarn is drawn through inner nozzles of a matrix and a yarn formed from the matrix material is drawn through outer nozzles, so that the blended yarn is surrounded by the matrix material yarn in a so-called "guide". By heating, the matrix material yarn fibers fuse together to form the matrix, in which reinforcing fibers of the blended yarn are then embedded and extend untwisted in the longitudinal direction of the fibers parallel to each other.

Stranding or laying the reinforcing fibers during manufacture of the fiber strand is not disclosed.

JP H01 266231 A also discloses a stranded cable comprising a core strand and a single outer layer formed of a plurality of unstranded fiber lines.

WO2008/129116 A1 describes a laid elevator cable comprising a core cable around which a plurality of outer layers are laid to form the elevator cable. Individual fiber lines are formed from a fiber composite material having parallel reinforcing fibers. Each outer layer is formed from a plurality of individual, unstranded fiber lines.

From JP H09 21082 A fiber strands as well as a laid cable are known. Several parallel reinforcing fiber yarns are drawn through an impregnating bath comprising a thermoplastic resin and a matrix and then twisted to form a fiber strand. A plurality of fiber lines are twisted to form a laid fiber cable having a single-strand core cable and an outer layer of six individual, unstranded fiber lines.

Another laid cable in which a core cable is surrounded by an outer strand layer is known from EP 3006 611 A1. Reinforcing fibers embedded in a matrix run parallel to each other, i.e. they are not laid or twisted.

From EP 0 252 830 A1 a line cable for a crane control line is known, but not a laid cable.

While wire cables have a high breaking strength combined with high weight, hybrid cables in particular are lighter but, when wound in multiple layers, for example on a cable drum, have less flexural fatigue strength and less transverse compressive strength.

Particularly good bending fatigue strength and transverse compressive strength are required for cables that are frequently deflected during use, for example for so-called running cables used for a drum drive of a rotating tower crane.

SUMMARY

The invention relates to a laid cable (1-1b), in particular a laid fiber cable (1-1b) or a laid hybrid cable, comprising at least one core strand or a laid core cable (2-2b) and at least one outer strand (7-7b) surrounding the core strand or the core cable (2-2b), the core strand, the core cable (2-2b) and/or the at least one outer strand is composed of at least one fiber line (9-9b, 10-10b). The at least one fiber line (9-9b, 10-10b) is beneficially made of a composite material having reinforcing fibers (12), the reinforcing fibers (12) of which composite material are laid to form at least one reinforcing line (11).

Advantageously, a laid cable which is stable under transverse pressure is provided. The invention also relates to a strand, to a method for manufacturing a cable and a strand, to an apparatus for producing a cable and/or a strand, as well as an apparatus with a drum drive, said apparatus comprising a cable according to the invention.

DETAILED DESCRIPTION

The present invention is based on the task of forming a laid cable and a strand of the above-mentioned type which is particularly durable and, in particular, resistant to bending fatigue and transverse pressure. Furthermore, the invention is based on the task of forming a laid cable or a strand of the above-mentioned type, which has a particularly high tensile strength with low weight.

According to the invention, the task is solved in that the at least one fiber line is formed from a composite material having reinforcing fibers, the reinforcing fibers of which are laid to form at least one reinforcing line.

The fact that the at least one fiber line is formed from a composite material in which laid reinforcing fibers are embedded in a matrix means that previously unusable, in particular non-metallic, fibers such as carbon fibers can be used to advantage for high-strength cables.

Reinforcing fibers laid to form a reinforcing line are in the form of a strand or laid cable and can preferably be produced by stranding or laying apparatii known from wire cable technology.

In the reinforcing line, layers of several reinforcing fiber layers adjacent in the radial direction can have an opposite lay direction. Advantageously, a semi rotation resistant reinforcing line is formed.

All in all, a fiber line is created which is resistant to bending and particularly stable under transverse pressure and which forms the basis for the production of laid core cable or strands from which, in turn, laid cables can be made. Overall, a cable or strand is created whose individual components, i.e. the fiber lines, are in themselves already very resistant to bending and particularly stable to transverse pressure.

In the spirit of the present invention, reinforcing fibers may be in the form of yarn, individual filaments, twisted yarns, or bundles of multiple substantially parallel filaments.

It is conceivable that the reinforcing fibers have cross-sections which are different from one another.

The at least one fiber line may have a round or polygonal, for example trapezoidal, cross-section.

A fiber line which is or can be stranded with other fiber lines and/or metal wires to form a strand, for example a core or outer strand, has in particular a diameter of 0.5 to 2 mm, preferably between 1 and 1.5 mm.

A fiber line which is or can be laid with other fiber strands and/or metal wires to form a core cable has in particular a diameter of 0.5 to 2 mm, preferably between 1 and 1.5 mm.

It is conceivable that the at least one outer strand, the core cable or the at least one core strand has a diameter of up to 100 mm, in particular between 15 and 60 mm, preferably between 20 and 40 mm.

Although it is conceivable that the at least one reinforcing line is formed from metallic reinforcing fibers or metallic and non-metallic reinforcing fibers, the at least one reinforcing line is expediently formed from non-metallic reinforcing fibers and is preferably produced by a an apparatus for producing wire cables or wire strands.

Suitable reinforcing fibers can, for example, be glass fibers, mineral fibers, aramid fibers, textile fibers or carbon fibers or have a combination of high-strength metallic or non-metallic filaments. Conceivably, reinforcing fibers of the at least one reinforcing line may be formed from different materials. For example, a portion of the reinforcing fibers may be formed of carbon while another portion is formed of aramid.

By using an existing apparatus for the production of wire cable or wire strands, existing apparatii known from wire cable technology can be used.

In one embodiment of the invention, the at least one reinforcing line is formed of a blended yarn comprising reinforcing fiber filaments and filaments of a material from which a matrix is formed, into which matrix the at least one reinforcing line is embedded to form the fiber line.

Any polymer is suitable as a matrix, preferably thermoplastics such as polyethylene (PE), polypropylene (PP), polyamide (PA), polycarbonate (PC) or polyetheretherketone (PEEK).

A blended yarn is a yarn whose filaments are formed from reinforcing fiber filaments as well as, in particular, thermoplastic plastic filaments. When using a blended yarn, no impregnation is required to form a plastic matrix into which the reinforcing line is embedded; instead, so-called pultrusion under heating is sufficient. Advantageously, a particularly dense and homogeneous matrix can be formed, and air inclusions are advantageously avoided.

It is expedient that the at least one reinforcing line is designed as a reinforcing strand or a reinforcing cable. Advantageously, existing stranding or laying apparatii known from wire cable technology can be used to produce the reinforcing line. Both the reinforcing cable and the reinforcing strand can be multilayered and have cross-sectional geometries known from wire cables.

In a further embodiment of the invention, a proportion of the at least one reinforcing line in the at least one fiber line is at least 40% by volume, in particular between 45% by volume and 90% by volume, preferably between 50% and 75% by volume. The higher a proportion of the reinforcing line, the higher is the tensile strength of the fiber line and thus of the stranded cable or strand. Advantageously, a strength can be tailored for different applications.

Expediently, the at least one core strand or the laid core cable and the at least one outer strand surrounding the at least one core strand or the laid core cable are movable relative to each other, preferably in the longitudinal direction of the cable.

Especially under load, for example when the cable is used as a load cable of a rotating tower crane, relative movability is required to achieve particularly good mechanical strength. Neighboring outer strands and/or outer strands directly surrounding the at least one core strand or the laid core cable can abut each other to form a separating plane.

Advantageously, a particularly bending-resistant, bending-change-resistant and transverse-pressure-stable laid cable or strand is created.

Preferably, a cable according to the invention is used as a running cable of a drum-driven apparatus, especially in a drum-driven crane.

It is conceivable that each fiber line is covered with a layer that has a coefficient of friction that is in particular less than 0.2, preferably less than 0.14.

Although conceivably a sheathing at least partially surrounding the at least one core strand or the laid core cable is formed as an outer region of the matrix of the composite material of the at least one fiber line, in a further embodiment of the invention the at least one core strand or the laid core cable is at least partially surrounded by a sheathing, the sheathing being formed in particular from a different material than a matrix of the at least one fiber line into which the at least one reinforcing line is embedded.

Conceivably, the sheathing is formed of the same material as the matrix of the at least one fiber line forming the at least one core strand or the core cable.

It is also conceivable that fiber lines which can be stranded to form a strand or laid to form a stranded core cable or stranded cable have a matrix which, in cross-section, comprises, for example, an annular outer region and an inner region, the at least one reinforcing line being incorporated only into the inner region of the matrix. The outer region can be deformed during stranding or laying of a plurality of fiber lines, preferably by heating the fiber lines to a temperature at which a thermoplastic forming the matrix is deformable, such that outer regions of adjacent fiber lines form a one-piece sheathing during stranding or laying, which sheathing is formed from the same material as the matrix. Advantageously, the at least one core strand or core cable is protected from abrasion by outer strands or weathering.

It is conceivable that the sheathing is made of a material that has a coefficient of friction of <0.15.

In one embodiment of the invention, the cable is designed as a semi rotation resistant or rotation resistant cable. Advantageously, a particularly long-lasting cable is created.

In one embodiment of the invention, the laid cable has a plurality of outer strands surrounding the core strand or the core cable, wherein the core strand, the laid core cable and the outer strands are formed from a plurality of fiber lines and each fiber line is formed from composite material having at least one reinforcing line. Advantageously, a particularly good flexural fatigue strength is achieved together with low weight and excellent transverse compressive stability.

Advantageously, the laid cable has a plurality of outer strands surrounding the core strand or the laid core cable, the core strand, the laid core cable and the outer strands being formed from a plurality of fiber lines and each fiber line being formed from a composite material having at least one reinforcing line, the fiber lines of the core strand, the laid core cable or the outer strands having different shapes and/or sizes from one another. Advantageously, mechanical properties such as a flexural fatigue strength, a transverse compressive stability or a tensile strength can be tailored for certain customer-specific cases.

The invention is further based on a method for producing a laid cable, in particular a laid fiber or a laid hybrid hybrid cable, which has at least one core strand or a laid core cable and at least one outer strand surrounding the core strand or the core cable, wherein the core strand, the core cable and/or the at least one outer strand being formed from at least one fiber line.

According to the invention, the task is solved in that the at least one fiber line is formed from a composite material comprising reinforcing fibers, the reinforcing fibers of which are laid to form at least one reinforcing line.

In one embodiment of the method, a plurality of lines of a blended yarn comprising reinforcing fiber filaments and filaments formed from a preferably thermoplastic resin are laid and pultruded under heating to form the fiber line.

Pultrusion advantageously ensures that no defects occur during the production of the fiber lines, for example air inclusions. Further advantageously, no coating of the yarn is required prior to stranding or laying, since the matrix material is co-laid as filaments of the blended yarn and the matrix are formed during pultrusion.

The invention is also based on the task of creating an apparatus by means of which stranding apparatii already known and used for wire cable production can continue to be used, and in particular for the production of predominantly non-metallic stranded cables or strands.

According to the invention, the task is solved in that the apparatus comprises a pultrusion apparatus which is connected upstream of a first stranding and/or laying apparatus and downstream of a further stranding or laying apparatus.

The reinforcing lines can be unwound from several bobbins and laid to form the reinforcing line using a first existing stranding or laying apparatus. Preferably, a blended yarn is used, that is, a yarn whose filaments are formed from reinforcing fiber filaments as well as, in particular, thermoplastic plastic filaments. After the reinforcing and plastic filaments have been laid, pultrusion, i.e. drawing under heating, takes place, whereby the plastic filaments form a homogeneous matrix into which the laid reinforcing fibers are embedded. Fiber lines produced in this way, which preferably have a round cross-section, can be stranded into a strand, cable or core cable using an existing stranding or laying apparatus downstream of the pultrusion device.

Further advantageously, an existing apparatus usable for wire cable production need only be supplemented by a pultrusion device in order to be able to produce a stranded cable or strand according to the invention. There is no need to purchase additional or special apparatii.

The invention is further based on the task of creating a method with which the maturity for discard of a laid cable according to the invention can be reliably determined.

According to the invention, the task is solved by determining, on the basis of a number of damaged or torn fiber lines of outer strands, whether the laid cable is mature for discard. It is advantageous to use methods known from wire cables and standardized methods for determining maturity for discard.

In a first process step, for example, the entire length of the laid cable can be inspected for cracks or damage. The area in which the most damaged or broken fiber lines are detected forms a so-called reference length, i.e. a cable section which is used to determine the maturity for discard. The reference length is preferably an integral multiple of the cable diameter, for example thirty times. The reference length is used to determine whether a number of damaged or torn fiber lines is above or below a threshold value for the cable type under investigation. Technically recognized threshold values for different cables types are known, for example, from the German VDI Guideline 2358.

In one embodiment of the invention, the at least one core strand or core cable is surrounded by at least one outer strand layer comprising a plurality of outer strands, preferably with a matrix material of a matrix of the core strand or core cable abutting against a matrix material of the outer strands. Direct contact of reinforcing lines of one fiber line with those of an adjacent fiber line is advantageously prevented. The fact that the core strand or the core cable only abuts against the outer strands means that there is no material-to-material bonding.

It is conceivable that a core strand, a core cable or an outer strand is formed from up to fifty fiber lines and up to ten outer strand layers surrounding the core strand are provided. Surrounding means in particular that the outer strands are stranded (=laid) with the at least one core strand or the core cable by manufacturing techniques known from wire cable production.

BRIEF DESCRIPTION OF THE DRAWINGS

Embodiments of the invention are to be explained in more detail below on the basis of examples with reference to the non-limiting figures.

DETAILED DESCRIPTION OF THE PREFERRED EMBODIMENTS

Figure 1A:
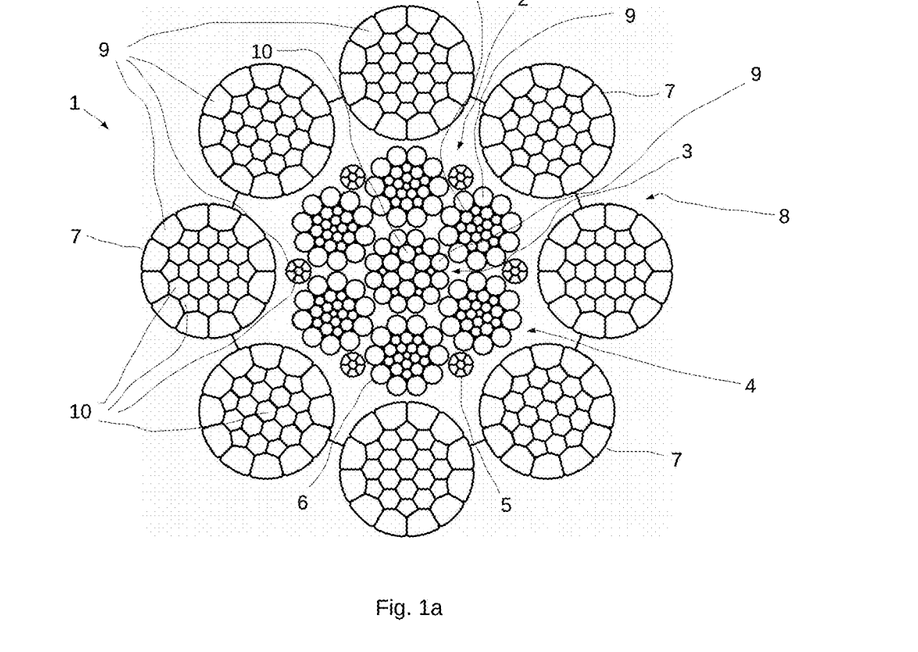
FIG. 1A shows a first embodiment of a cable according to the invention and an exemplary embodiment of a strand according to the invention.

A laid cable 1 shown schematically in cross-section in FIG. 1A comprises a laid core cable 2 having a core strand 3 and an outer core strand layer 4. Outer core strands 5, 6 of the outer core strand layer 4 have different cross-sectional sizes and shapes, in particular different from each other.

The core cable 2 is laid with a total of eight outer strands 7 forming a single outer strand layer 8 to form the cable 1. A cable 1 shown in FIG. 1A is semi rotation resistant.

Figure 1B:
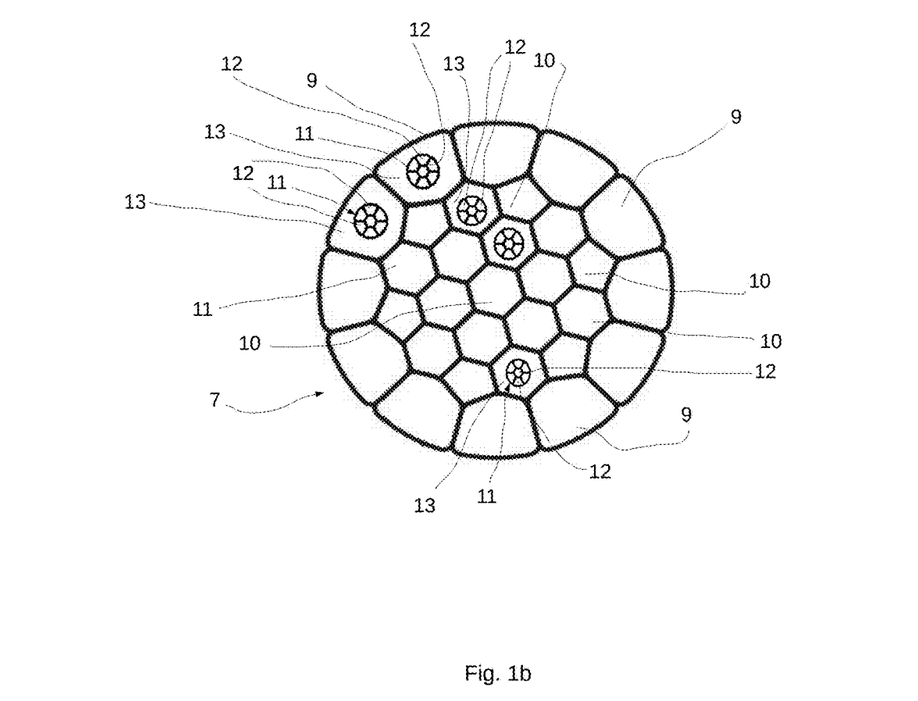
FIG. 1B shows a second embodiment of a cable according to the invention and an exemplary embodiment of a strand according to the invention.

To form a round outer strand 7 of a cable 1 as shown schematically in detail in FIG. 1B according to FIG. 1A, thirty-one fiber lines 9, 10 were stranded, twelve fiber lines 9 being equal in cross-section and larger than the other nineteen fiber lines 10, which fiber lines 10 are approximately equal in cross-section.

The fiber lines 10 are inner fiber lines of a core cable 2 or a strand 5, 6, 7, the fiber lines 9 are outer fiber lines of a core cable 2 or a strand 5, 6, 7.

Each fiber line 9, 10 comprises a reinforcing line 11 extending in a longitudinal direction of the fiber line and having a plurality of reinforcing fibers 12 formed of carbon stranded into a reinforcing line and embedded in a polypropylene matrix 13.

For clarity, reinforcing lines 11 and reinforcing fibers 12 are not shown for all fiber lines 9, 10 in FIG. 1B.

Although all strands of a cable 1 shown in FIG. 1A are formed from fiber lines 9, 10 with exclusively non-metallic reinforcing fibers 12, it is conceivable that individual reinforcing fibers 12 are formed from a metal wire. A strand comprising such a fiber line is a so-called hybrid strand, and a cable comprising such a fiber line is a so-called hybrid cable.

Advantageously, existing stranding or laying apparatii originally intended for wire cable production can be used to produce the laid cable 1 according to the invention, and at the same time a particularly light as well as bending-change-resistant and particularly transverse-pressure-stable stranded cable can be created.

The fiber lines 9, 10 can be produced by pultrusion by unwinding a blended yarn comprising a reinforcing fiber 12, which blended yarn comprises filaments made of, for example, polypropylene as well as of carbon, from a plurality of yarn bobbins and laid in a first stranding or laying apparatus. During pultrusion, i.e. under tensile stress, in a pultrusion device upstream of the first stranding or laying apparatus and downstream of a second stranding or laying machine, the polypropylene filaments soften under heating and form a homogeneous matrix 13 into which the reinforcing fibers 12 laid to form a reinforcing line 11 are embedded.

After cooling and solidification of the matrix 13, the fiber lines 9, 10 can be further processed with the second stranding or laying apparatus, which is located downstream of the pultrusion device.

Winding onto storage spools before further processing is conceivable.

Due to the fact that polypropylene forming a matrix 13 is deformable by heating the fiber line 9, 10 and solidifies again by cooling, it is conceivable to change the cross-sectional shape or size by applying deformation forces. For this purpose, a heating device may be provided which is arranged before or at a stranding or laying point of a corresponding stranding or laying apparatus.

It is conceivable that individual fiber lines 9, 10 are deformed in such a way that a trapezoidal or polygonal cross-section is formed, as it is shown for example in FIG. 1A.

It is also conceivable that a cross-sectional shape or size of individual fiber lines is changed prior to stranding or laying or of manufactured cables.

Figure 1C:
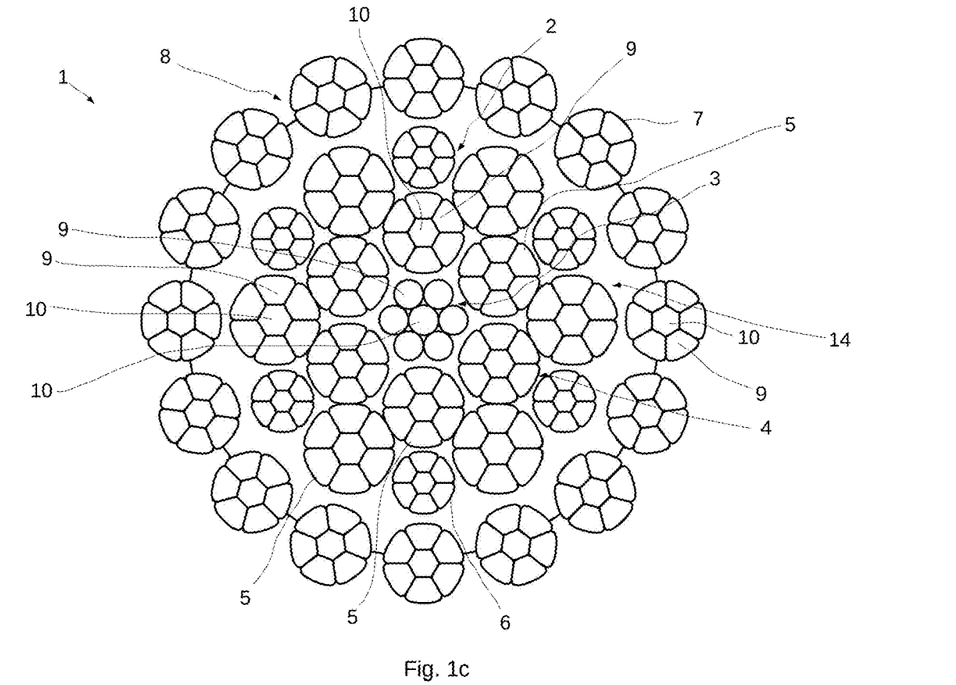
FIG. 1C shows a third embodiment of a cable according to the invention and an exemplary embodiment of a strand according to the invention.

A laid cable 1 shown schematically in cross-section in FIG. 1C differs from that shown in FIG. 1A in that a laid core cable 2 has a core strand 3 and two outer core strand layers 4, 14, of which the outermost core strand layer 14 has outer core strands 5, 6 which have diameters different from one another.

Furthermore, the core strand 3 is formed of seven fiber lines 9, 10 of round cross-section, while outer strands 7 of round cross-section are formed of seven fiber lines 9, 10 of polygonal cross-section.

Reference is now made to FIG. 2, where identical or equal-acting parts are designated with the same reference number as in FIG. 1 and the letter a is added to the respective reference number.

Figure 2A:
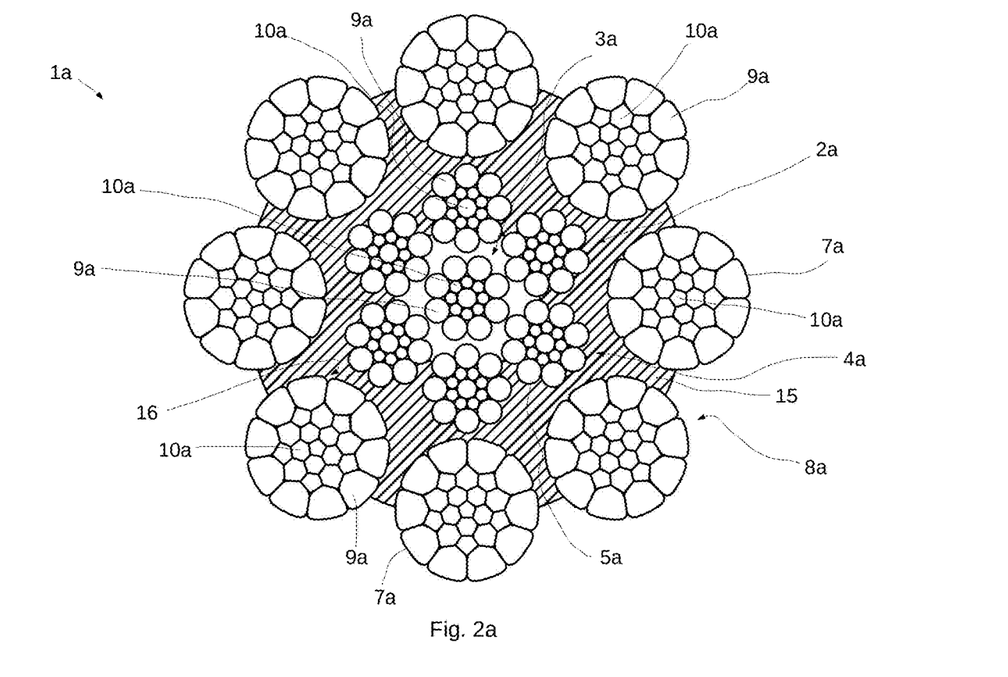
FIG. 2A shows a first embodiment of another cable according to the invention.

A laid cable 1a shown schematically in cross-section in FIG. 2A differs from those shown in FIG. 1 in that a core cable 2a is surrounded by a shaded sheathing 15 into which halves 16 of outer strands 7a facing the core cable 2a are embedded. The sheathing 15 protects outer core strands 5a from damage.

The sheathing 15 can be formed by laying the core cable 2a with the outer strands 7a in a plastic bath comprising molten plastic forming the sheathing, preferably thermoplastic plastic such as polypropylene (PP) or polyethlyene (PE).

In addition, the core cable 2a has a core strand 3a and a single outer core strand layer 4a. The core strand 3a and the outer core strands 5a have identical cross-sections.

Figure 2B:
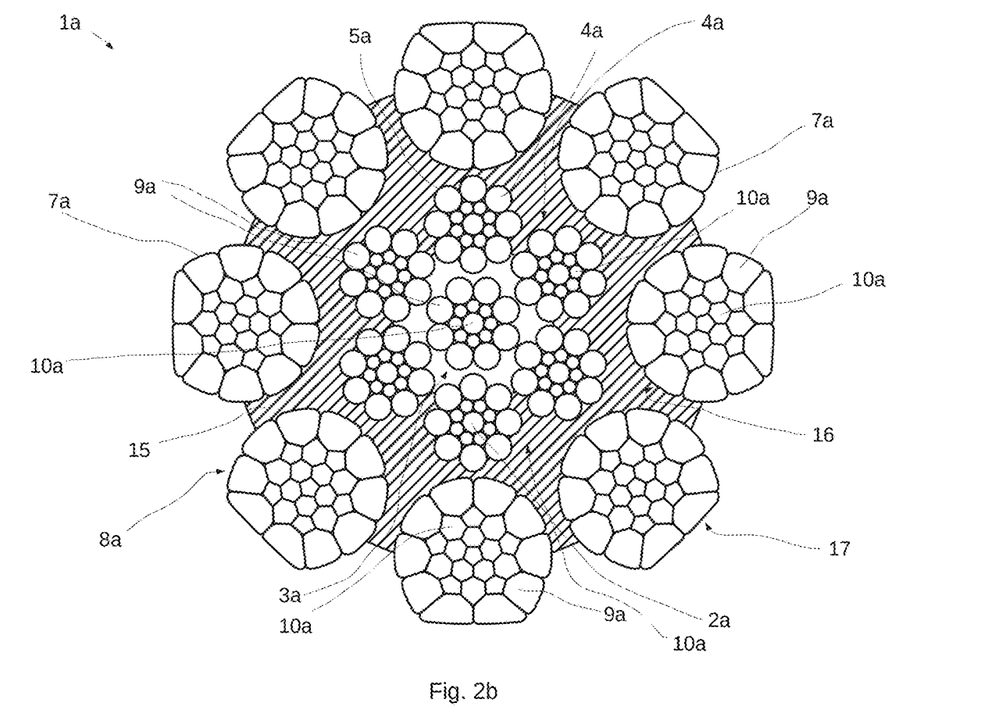
FIG. 2B shows a second embodiment of another cable according to the invention.

A laid cable 1a shown in cross section in FIG. 2B differs from that shown in FIG. 2A in that outer strands 7a are flattened on a side 17 facing away from the core cable 2a. This is possible, for example, by hammering, with or without prior heating.

Reference is now made to FIG. 3, where identical or equal-acting parts are designated with the same reference number as in FIGS. 1 and 2, and the letter b is added to the respective reference number.

Figure 3A:
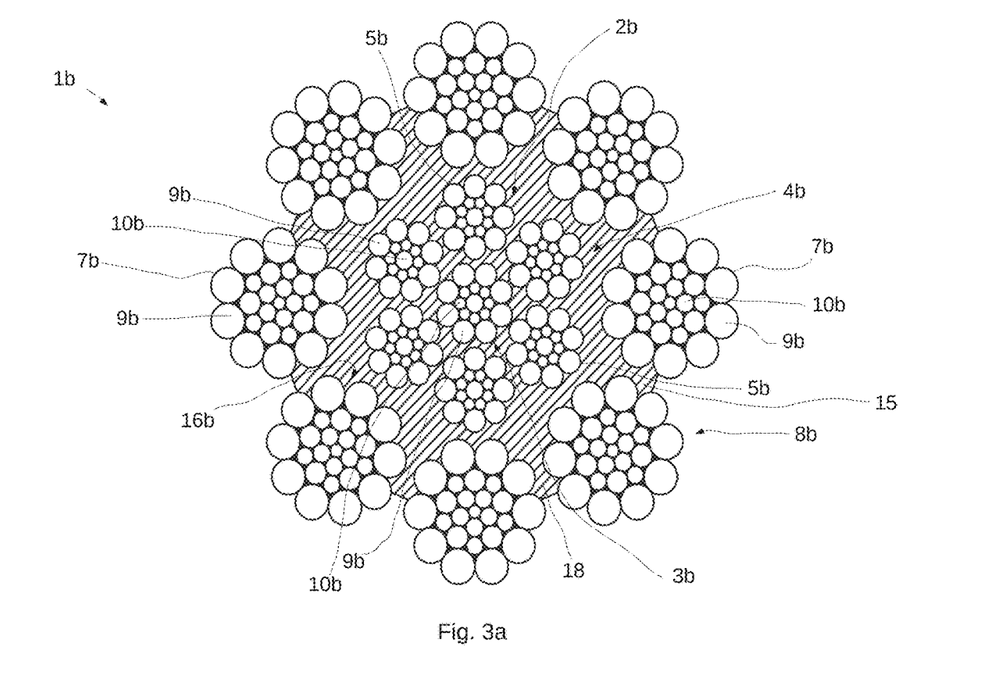
FIG. 3A shows a first embodiment of a third cable according to the invention.

A laid cable 1b shown in cross-section in FIG. 3A differs from those shown in FIGS. 1 and 2 in particular in that a core cable 2b and outer strands 7b are embedded into a single polypropylene matrix 18 acting as a sheathing such that both a core strand 3b and outer core strands 5b and halves 16b of the outer strands 7b facing the core cable 2b are embedded into the matrix 18, said matrix being the sheathing. The matrix material of the matrix 18 may be different from the matrix material comprising the fiber lines 9b, 10b.

The laid cable 1b shown in FIG. 3A can be produced by stranding or laying fiber lines 9b, 10b in a molten polypropylene bath.

It is conceivable that the laid cable 1b is produced by stranding or laying fiber lines 9b, 10b, which in cross-section have an annular outer region not shown in FIG. 3 and an inner region of a matrix designated 13 in FIG. 1B, a reinforcing line being incorporated only into the inner region. The outer region can be deformed during stranding or laying of the fiber lines, preferably by heating up to a temperature at which a thermoplastic forming a matrix is deformable, in such a way that the outer regions form the matrix 18 being the sheathing during stranding or laying adjacent fiber lines 9b, 10b.

Figure 3B:
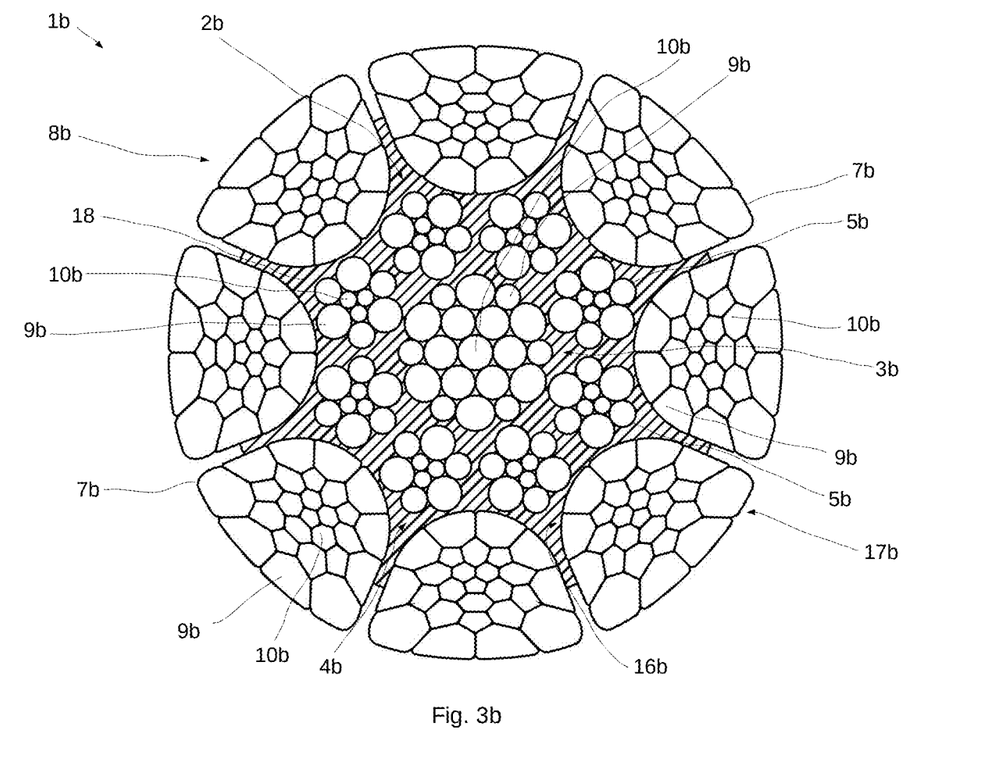
FIG. 3B shows a second embodiment of a third cable according to the invention.

A laid cable 1b shown in cross-section in FIG. 3B differs from that shown in FIG. 3A in particular in that outer strands 7b are flattened on a side 17b facing away from the core cable 2b, the flattened areas forming circular arcs.

It is understood that all possible combinations of features shown in FIGS. 1 to 3 are conceivable. For example, a laid cable shown in FIG. 1A may have outer strands according to FIG. 3B.

Although cables 1-1b with a single outer strand layer 8-8b are shown in FIGS. 1 to 3, it is conceivable that multiple outer strand layers are provided. Preferably, adjacent outer strand layers may have opposite lay directions so that a semi rotation resistant cable or rotation resistant cable is created.

It is also conceivable that reinforcing fibers are used that are formed from different materials and/or have different cross-sectional sizes. In particular, this is possible when using a blended yarn that is unwound from multiple yarn bobbins to produce a fiber line 9-9b, 10-10b. It is further conceivable that each fiber line 9-9b, 10-10b has more than one reinforcing line 11, for example two or three, which preferably extend parallel to each other in the longitudinal direction of the cable.

The invention claimed is:

1. A laid fiber cable for use as running cable in an apparatus with a drum drive, comprising a laid core cable and several outer strands surrounding the laid core cable,
   wherein the laid core cable is at least partially surrounded by a sheathing,
   wherein the laid core cable and several outer strands are each composed of several pultruded fiber lines,
   wherein the pultruded fiber lines are made of a composite material having non-metallic reinforcing fibers, the non-metallic reinforcing fibers of which composite material are stranded to form at least one reinforcing line,
   wherein the reinforcing line comprises at least a first layer of the non-metallic reinforcing fibers and a second layer of the non-metallic reinforcing fibers adjacent in the radial direction to the first layer of the non-metallic reinforcing fibers, and
   wherein the first layer and the second layer have an opposite lay direction.

2. The laid fiber cable according to claim 1, wherein a proportion of the at least one reinforcing line in the at least one fiber line is between 50 and 75% by volume.

3. The laid fiber cable according to claim 1, wherein the laid core cable and the outer strands surrounding the laid core cable are movable relative to each other in the longitudinal direction of the cable.

4. The laid fiber cable according to claim 1, wherein the sheathing is formed from a different material than a matrix of the at least one fiber line into which the at least one reinforcing line is embedded.

5. The laid fiber cable according to claim 1, wherein the laid fiber cable is designed as a semi rotation resistant cable or rotation resistant fiber cable.

6. An apparatus with a crane with a drum drive, which has a laid fiber cable according to claim 1, wherein the laid fiber cable is designed as a running cable.

\* \* \* \* \*